March 24, 1931.  E. J. PILBLAD  1,797,442
BRAKING DEVICE FOR SPRING SUSPENSION
Original Filed Dec. 23, 1926  2 Sheets-Sheet 1
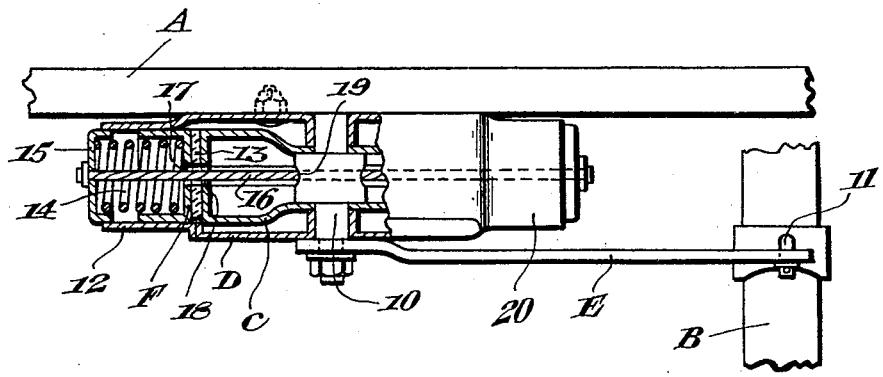
FIG. 2.
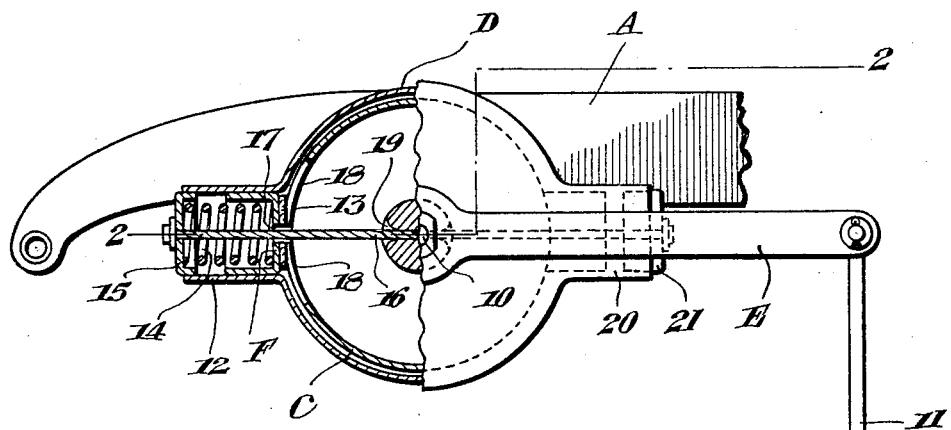
FIG. 1.
Inventor
Eric J. Pilblad
BY
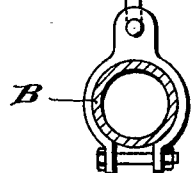
Attys.

March 24, 1931.  E. J. PILBLAD  1,797,442
BRAKING DEVICE FOR SPRING SUSPENSION
Original Filed Dec. 23, 1926  2 Sheets-Sheet 2
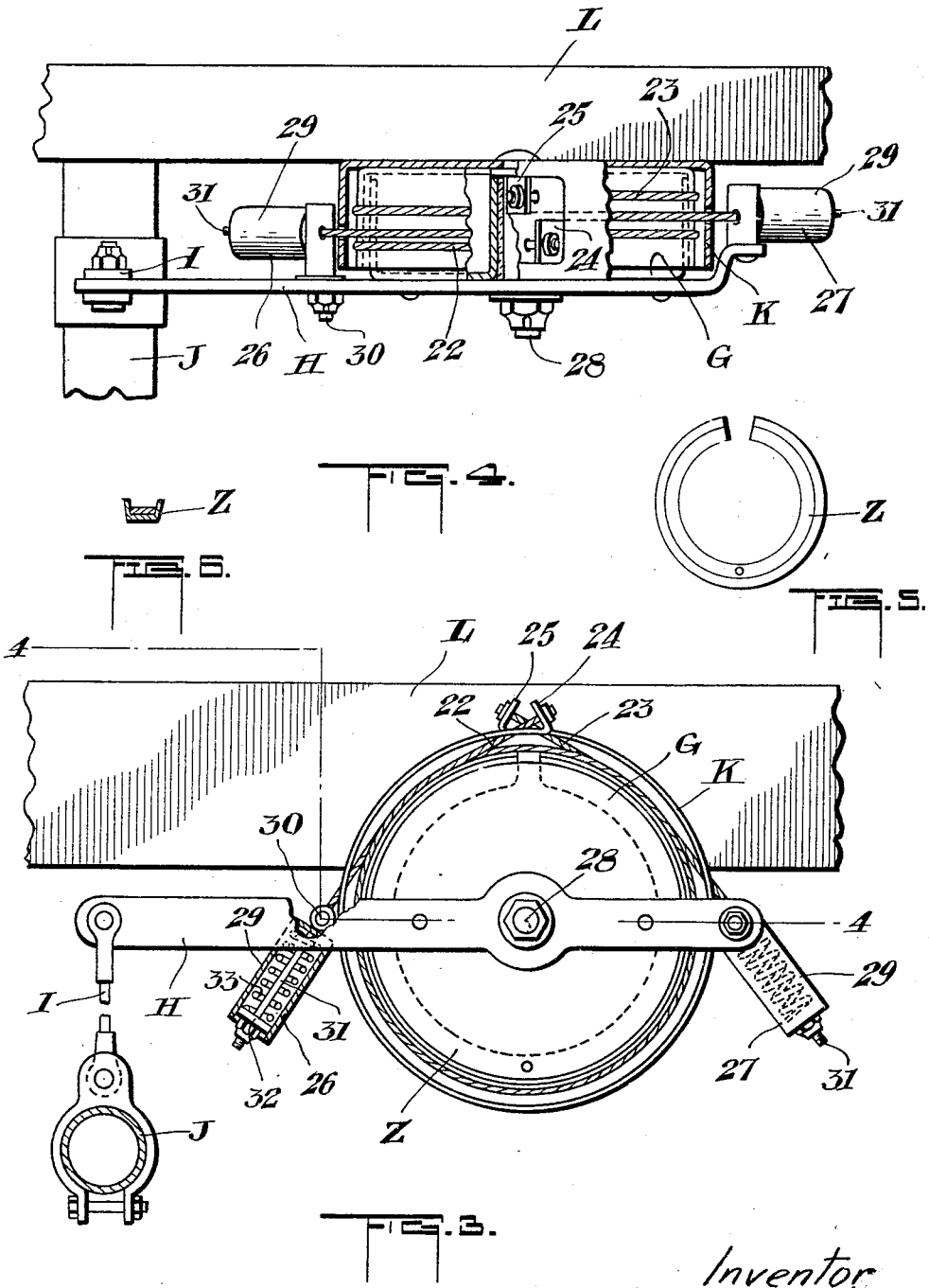
Inventor
Eric J. Pilblad Patented Mar. 24, 1931

1,797,442

UNITED STATES PATENT OFFICE

ERIC JULIUS PILBLAD, OF BROOKLYN, NEW YORK, ASSIGNOR, BY MESNE ASSIGNMENTS, TO LEOPARD AUTOMOBILE PRODUCTS CORPORATION, OF NEW YORK, N. Y., A CORPORATION OF DELAWARE

BRAKING DEVICE FOR SPRING SUSPENSION

Application filed December 23, 1926, Serial No. 156,710. Renewed August 6, 1930.

This invention relates to improvements in controlling devices for spring suspension systems, and more particularly with reference to particular features thereof it relates to improvements in shock absorbers or similar controlling devices for spring suspension systems of vehicles.

It is a general object of the invention to provide an improved, simple, and effective mechanism for applying controlling restraint to control the relative movements between the frame and axle of a vehicle, thereby to improve the riding qualities and to restrain the amplitude of vibration of the moving parts.

Another object is to provide an improved controlling device for spring suspension systems or the like which will apply the controlling restraint to the relatively movable parts with an accelerated rate of gain in either direction from a neutral position.

Further objects are generally to improve and simplify the construction of the device to better adapt it to perform the functions required of it. And it consists essentially of the improved construction and arrangement of parts hereinafter described in detail in the accompanying specifications and drawings.

Referring to the drawings:

Fig. 1 is a sectional elevation of an embodiment of the invention.

Fig. 2 is a sectional plan taken in part on a line 2—2 of Fig. 1.

Fig. 3 is a sectional elevation of a modified form of the invention.

Fig. 4 is a sectional plan taken in part along the line 4—4 of Fig. 3.

Fig. 5 is a side view of brake member Z, and

Fig. 6 is a section through the same.

In the drawings, like characters of reference indicate corresponding parts in all the figures.

Referring to the drawings:

Reference to Figs. 1 and 2, A indicates a frame of a vehicle, and B the axle thereof. C indicates a braking drum which is mounted on an axle or shaft 10 journalled in a casing D secured to the frame A. The axle 10 is connected to and moves with a lever E connected by a link 11 with the vehicle axle B. F indicates a friction producing or braking member which is axially movable in a housing 12 formed on the casing D and has a suitable facing 13 of friction producing material such as asbestos brake lining, and which is designed to bear against the friction drum C. The member F is held against the drum C by a compression spring 14, the outer end of which is engaged by a cap or washer 15 connected to a flexible member 16 in the form of a cable of wire or cord which extends through the slot 17 in the member F, a corresponding peripheral slot 18 in the drum C, and a transverse radial slot 19 in the shaft 10 to a corresponding brake member located in the housing 20 which is diametrically opposite and corresponds to the housing 12 and contains a similar brake member, cable 16 being connected to the cap or plate 21 of the said member which corresponds to the cap or plate 15. It will be seen that as the housing D and the housings 12 and 20 are fixed, the cable 16 will be shortened through turning of the shaft or stud 10, thereby drawing the braking members with increasing force against the periphery of the drum C, and that this operation takes place upon movement of the lever E in either direction from a normal position in which the cable 16 extends in a substantially straight line between the braking members.

In the alternate form of the invention shown in Figs. 3 and 4, two flexible cables or cords 22 and 23 are provided which are wound in opposite directions about the drum G contacting with a pivoted brake member Z about the periphery thereof. One end of each cable is anchored in the fixed brackets 24 and 25, while the opposite end is held in spring connection devices 26 and 27 supported on the lever H at opposite sides of the fulcrum 28. These spring devices each comprise a sleeve 29 connected to the lever as by bolt 30 and having a bolt or rod 31 within having a washer or plate 32 which bears against a compression spring 33 the opposite ends of which bear against the sleeve, the bolt 31 being connected to the extremity of the cable 22 or 23. The friction drum G is connected to and moves with the lever H, the other extremity of the lever being connected by the link I with the vehicle axle J. The housing K for the drum G as well as the fulcrum for the lever H and member Z are supported from the vehicle frame L.

It will be seen that upon swinging the lever H from its normal position in either direction, the spring connections 26 or 27 will tighten one or other of the cables 22 or 23 about the drum and so offer a frictional resistance to its movement with an accelerated rate of gain due to the increase in the friction in proportion to the movement. Such a device will be found extremely useful for the purposes hereinbefore stated.

As many changes could be made in the above construction and many different embodiments of the invention made within the scope of the appended claims, it is intended that all matter herein contained should be regarded in an illustrative and not in a limiting sense.

What I claim as my invention:

1. A device of the character described comprising in combination a turnably mounted friction drum, a lever connected to and turning with the same, a cable controlled friction member adapted to bear against the drum actuated by movement of the lever and adapted to be gradually tightened against the periphery of the drum upon movement of the lever from a given normal position.

2. A device of the character described comprising in combination a friction drum, a lever for actuating same, fixed supporting means for the drum and lever, a friction applying device for the drum actuated by the lever including a cable connection adapted to apply the friction with an accelerated rate of gain depending upon movement of the lever from its given normal position.

3. In a device of the character described in combination, a friction drum, a lever for actutuating said drum, fixed supporting means for the drum and lever, a friction applying device for the drum actuated by said lever, and including a cable connection for applying the friction upon movement of the lever from its normal position, and means for controlling said cable connection for applying the friction against movement of the lever in either direction from its normal position.

4. In a device of the character described in combination, a turnably mounted friction drum, a lever connected to said drum and turning therewith, a plurality of opposing friction members adapted to bear against said drum, a cable connection to said friction members and actuated by movement of the lever, and means whereby said cable may be gradually tightened to cause said friction members to bear against said periphery of the drum upon movement of the lever from a given normal position.

5. In a device of the character described in combination, a rotary friction drum, a supporting shaft therefor upon which the drum rotates, a lever connected to and rotatable with said friction drum, a friction device contacting with the periphery of the drum, and an operating cable connected to said friction device and extending through an aperture in said shaft for controlling cable tension.

6. In a device of the character described in combination, a plurality of relatively movable elements frictionally co-operative with each other, connections for relatively moving said friction elements, and friction applying means including a cable operative upon relative movement of said friction elements for controlling the friction therebetween.

7. In a device of the character described in combination, a plurality of relatively movable elements frictionally co-operate with each other, connections for relatively moving said friction elements, friction applying means including a cable operatively connected to one of said friction elements, and means for varying the tension of said cable to vary frictional resistance between said friction elements.

8. In a device of the character described in combination, a plurality of concentrically arranged, relatively rotatable, friction elements, frictionally co-operative with each other, connections for relatively rotating said friction elements, friction applying means including a cable connected to the outer concentric friction element and extending inwardly toward the inner friction element and a cable tension controlling member positioned inwardly of the outer friction element to vary the frictional resistance between said friction elements.

9. In a device of the character described in combination, a plurality of concentrically arranged, relatively rotatable, friction elements, including a plurality of outer friction elements, a fixed supporting stud upon which an inner friction element is rotatably mounted, and a cable connected to a plurality of said outer friction elements and connected to said supporting stud to vary the tension of said cable for controlling frictional resistance between said friction elements.

10. In a device of the character described in combination, relatively rotatable, frictionally co-operating friction elements, including a friction drum, operating connections for relatively moving said friction elements, a cable extending circumferentially of said friction elements to control friction thereof on said drum and connections between said operating connections and said cable to control the tension of the latter.

11. In a device of the character described in combination, relatively rotatable, frictionally co-operating, friction elements including a friction drum, operating connections for relatively moving said friction elements and including a lever connected to rotate the drum, an anchor member with reference to which the drum is rotatable, a cable extending circumferentially of one said friction element to control the friction thereof on said drum, said cable being connected to said lever and to said anchor member.

12. In a device of the character described in combination, relatively rotatable, frictionally co-operating, friction elements including a friction drum, operating connections for relatively moving said friction elements and including a lever connected to rotate the drum, an anchor member with refrence to which the drum is rotatable, a cable extending circumferentially of one said friction element to control the friction thereof on said drum, said cable being connected to said lever and to said anchor member, and a yielding element interposed in the cable connections.

13. In a device of the character described in combination, relatively rotatable, frictionally co-operating friction elements including a rotary friction drum, operating connections including a lever connected to rotate said drum, a plurality of cables extending circumferentially in opposite directions about one of said friction elements to control the friction on the drum, and an anchor device with reference to which the drum is rotatable, and to which said cables are connected, said cables also being connected to said lever at opposite sides of its fulcrum.

14. In a device of the character described in combination, relatively rotatable, frictionally co-operating friction elements including a rotary friction drum, an operating lever connected to effect rotation of said friction drum in opposite directions, and operating connections between said lever and certain of said friction elements to apply frictional pressure thereof on the drum with an accelerated rate of gain in either direction of drum rotation.

15. In a device of the character described in combination, a plurality of relatively rotatable frictionally co-operating friction elements including a rotary friction drum, an operating lever connected to effect rotation of said friction drum in opposite directions, and operating connections between said lever at opposite sides of the fulcrum thereof and certain of said friction elements, to apply frictional pressure thereof upon the drum in either direction of drum rotation.

16. In a device of the character described in combination, a plurality of relatively rotatable frictionally co-operating friction elements including a rotary friction drum, an operating lever connected to effect rotation of said friction drum in opposite directions, operating connections between said lever at opposite sides of the fulcrum thereof and certain of said friction elements to apply frictional pressure thereof upon the drum in either direction of drum rotation, and yielding elements interposed in said operating connections.

17. In a device of the character described in combination, a rotatable friction drum, a friction element concentric with said drum and anchored against rotation therewith, an operating lever connected to effect rotation of said friction drum in opposite directions, operating connections connected to said lever at opposite sides of the fulcrum thereof and connected to said friction element to apply frictional pressure thereof upon said drum during rotation of the latter in either direction, and yielding elements interposed in said operating connections.

In witness whereof I have hereunto set my hand.

ERIC JULIUS PILBLAD.